Patented Jan. 10, 1950

2,494,310

UNITED STATES PATENT OFFICE 2,494,310

PURIFICATION OF ALKYL AND SUBSTITUTED ALKYL PHOSPHATES

Edwin P. Plueddemann, Woodbridge, N. J., assignor to Food Machinery and Chemical Corporation, New York, N. Y., a corporation of Delaware No Drawing. Application February 1, 1945, Serial No. 575,735

11 Claims. (Cl. 202—57)

1

This invention relates to the purification of alkyl and substituted alkyl phosphates and particularly to the purification of crude reaction masses.

Alkyl phosphates are generally prepared by reacting phosphorus oxychloride or phosphorus pentachloride and an excess of an aliphatic alcohol or mixture of such alcohols. The reaction products contain as impurities hydrochloric acid, alkyl acid phosphates, excess alcohols and some alkyl chloride. This material is generally purified by first removing or eliminating the hydrochloric acid and other acid impurities through washing or through neutralizing with a base. When a base is used any excess is removed. This partially purified product is then distilled to remove first alcohol and alkyl chlorides. Thereafter, the alkyl phosphate is distilled at atmospheric or reduced pressure.

While the distillation of the lower trialkyl phosphates, such as triethyl or even tributyl phosphate, can be carried out without substantial decomposition, the distillation of higher alkyl esters, such as trioctyl phosphate, as normally carried out, leads generally to a substantial amount of decomposition of the higher alkyl phosphates before the high boiling neutral esters can be distilled from the reaction mixture even under a high vacuum.

Acid alkyl phosphates themselves decompose during the distillation and also catalyze further decomposition of the neutral esters, causing substantial losses in the purification process. Even pure trialkyl phosphates undergo some decomposition when they are distilled alone under vacuum and the impurities thus formed may catalyze extensive decomposition, especially among the higher boiling trialkyl phosphates.

I have found, however, that the purification of crude alkyl phosphates by distillation can be substantially improved if the distillation takes place in the presence of an excess of alkali. The presence of an excess of alkali prevents the decomposition experienced in the distillation of acidic or neutral reaction masses and is most advantageous in the distillation of the higher molecular weight alkyl phosphates containing at least 5 carbon atoms in the alkyl radical, such as those boiling at temperatures of 200° to 290° C. under the distillation pressure used. The presence of an excess of

2 alkali, however, also facilitates and improves the distillation of lower trialkyl phosphates from the impure reaction masses resulting from their formation.

It is believed the excess of alkali reacts with any acid impurities in the crude reaction mixture to form stable salts and thereby overcomes the destructive catalytic activity that such acids have on trialkyl phosphates at high temperatures. By maintaining an excess of alkali any traces of acid resulting from slow thermal decomposition of the esters are removed as soon as they are formed. I have discovered that trialkyl phosphates are quite stable in the presence of an excess of alkali as shown by the fact that pure trialkyl phosphates may be recovered in practically quantitative yields by re-distilling in the presence of an alkali.

It is, therefore, an object of my invention to provide an improved process for purifying alkyl and substituted alkyl and mixed alkyl aryl phosphates by distillation in which decomposition of the said phosphates is prevented or retarded by carrying out the distillation in the presence of an excess of alkali.

Another object of my invention is to provide a process for purifying crude alkyl phosphates without the necessity of first removing all of the acid impurities.

Various other objects and advantages of my invention will be apparent as this description proceeds.

When alkyl phosphates are produced by reacting phosphorus oxychloride or phosphorus pentachloride with aliphatic alcohols a substantial amount of hydrochloric acid is found in the reaction mass. In the purification of such crude alkyl phosphates, I have found it is advantageous to remove a substantial portion of the hydrochloric acid, although it is not necessary to remove substantially all of this material, before proceeding with the separation of the remaining ingredients by distillation. This acid may be removed by conventional methods as by washing, by neutralization with an alkali and then washing or separating out the neutralized acid, or by aeration After the removal of as much of the acidic ingredients as is convenient by separatory processes, the reaction mass is rendered alkaline by adding an alkali in excess of the amount necessary to neutralize any acidic substances remaining in the reaction mass. This partially purified reaction mass is first subjected to distillation to remove unreacted alcohols and alkyl chlorides and the alkyl phosphate is then recovered in a substantially pure form by further distillation, preferably at reduced pressure. In this manner, I have procured these substantially pure trialkyl phosphates in excess of 90% of the theoretical yield, showing that no material amount of decomposition takes place when the distillation is carried out in the presence of an excess of alkali. As stated above, when the distillation takes place from an acidic or neutral mass, substantial decomposition, particularly of the higher alkyl phosphates, occurs.

Phosphate esters containing substituted alkyl groups, such as chloroethyl, chlorobutyl, or other halogen-alkyl groups or aralkyl groups such as benzyl, may also be advantageously purified by distilling, as previously described, in the presence of an excess of an alkali. The suitability of the alkaline medium for the purification of halogen-alkyl phosphates is surprising in view of the known tendency of halogenated alkyl compounds to give off hydrogen and the halogen substituent in the presence of aqueous or alcoholic solutions of alkalis.

Phosphate esters containing benzyl groups are particularly sensitive to thermal decomposition in the presence of a trace of acid, often reacting violently to give off dense fumes while forming benzyl polymers mixed with an acid phosphate residue. In the presence of an excess of alkali these esters are much more stable so that mixed methyl benzyl, mixed butyl benzyl, and even mixed octyl benzyl phosphates may be distilled to give neutral high boiling liquids without substantial decomposition.

Various alkalies may be used in my purification process but sodium hydroxide and sodium carbonate are preferred. Other suitable alkalies are barium hydroxide, lithium carbonate, potassium carbonate, and the like. The alkalies may be introduced into the crude reaction mass in a suitable volatile solvent but they are preferably used in their solid state. The various carbonates have been found especially advantageous in the purification of trialkyl phosphates which are normally subject to "bumping" during the distillation process.

The amount of excess alkali used is preferably less than 4% by weight of the crude alkyl phosphate.

*Example I*

A substantially neutral crude tri-n-butyl phosphate was subjected, at atmospheric pressure, to a distillation temperature for the phosphate. Under these conditions, decomposition of the tributyl phosphate became so severe that heating had to be discontinued before distillation was complete. After the addition of a small amount of soda ash, sufficient to render the reaction mass alkaline, substantially pure tri-n-butyl phosphate was obtained as a distillate and was accompanied by little or no decomposition. The purified tri-n-butyl phosphate had a boiling point of 285° to 288° C.

*Example II*

A crude reaction mass containing substantial proportions of tri-n-hexyl phosphate was subjected to distillation at about 215° C. under 10 mm. of mercury pressure. A second portion of the same mass, containing soda ash, in excess of the amount necessary to make it neutrally reacting, was subjected to distillation at the same temperature and pressure. The purified tri-n-hexyl phosphate collected from the second distillation had about one-fourth of the acidity of that collected from the first distillation and as a result possessed substantially less corrosive properties. Additionally, the untreated crude reaction mass "bumped" badly during the distillation process while the crude mass, containing the excess of sodium carbonate, distilled smoothly.

*Example III*

A crude trioctyl phosphate reaction mass was washed with water to remove the bulk of acid present as hydrochloric acid. Due to a strong emulsifying action with alkaline aqueous solutions it was found impractical to reduce the acidity below the equivalent of about 30 ml. of 1.0 N base per 100 grams of mass. Distillation of this crude reaction mass with the assistance of porous plate boiling chips under 5 mm. of mercury pressure was impossible, resulting only in complete decomposition of the mass apparently to octene and an acid phosphate residue. When a portion of the same crude reaction mixture was subjected to distillation in the presence of a small excess of solid soda ash or sodium hydroxide or an admixture of the two very little decomposition took place and a product distilling at 210° to 220° C. under 5 mm. of mercury pressure, having an acidity equivalent to 1.0 ml. of 0.1 N base per 100 grams, was recovered in about 90% yield.

*Example IV*

A partially purified crude sample of trioctyl phosphate with an acid content equivalent to about 3 ml. of 0.1 N base per 100 grams of the phosphate was distilled with the assistance of porous plate boiling chips under 5 mm. of mercury pressure and gave a clear product boiling between 210° and 220° C. but was accompanied by a substantial decomposition of the trioctyl phosphate. This product had an acidity equivalent to 16 ml. of 0.1 N base per 100 grams. When a portion of the same partially purified trioctyl phosphate was subjected to distillation under the conditions described but in the presence of a small excess of solid soda ash or sodium hydroxide or an admixture of the two a substantially lesser amount of decomposition took place and a resulting product with an acidity equivalent to 0.2 ml. of 0.1 N base per 100 grams was recovered in a practically quantitative yield.

*Example V*

A crude tri-n-decyl phosphate was distilled in the presence of an excess of sodium hydroxide under 5 mm. of mercury pressure and gave a substantially pure product boiling at about 290° C. and was accompanied by a slight decomposition of the tri-n-decyl phosphate. The distillation product had an acidity equivalent to 5 ml. of 0.1 N base per 100 grams of distillate. When the same reaction mass was subjected to the distillation at the same temperature and pressure, in the absence of the excess of base, increased decomposition was noticed and a highly acidic distillate (equaling about 75 ml. of 0.1 N base per 100 g.) was obtained. The acidity of this latter product rendered it unsuitable for general use as a plasticizer.

*Example VI*

A crude chlorinated tributyl phosphate was washed with dilute caustic to remove hydrochloric acid and other acid impurities. The organic layer was distilled under a pressure of 10 mm. of mercury from porous plate boiling chips and yielded a monochlorinated fraction boiling at 175° to 195° C. and a small amount of dichlorinated ester boiling at 205° to 225° C. The distillation was accompanied by fuming and some decomposition. The monochlorinated fraction had an acid content equivalent to 170 ml. of 0.1 N base per 100 grams. A similar washed sample of chlorinated tributyl phosphate was also distilled in the presence of a small amount of soda ash with substantially less evidence of decomposition. The monochlorinated fraction recovered from this latter distillation had an acid content equivalent to less than 2.0 ml. of 0.1 N base per 100 grams.

*Example VII*

A crude mixed butyl benzyl phosphate was washed with an aqueous alkaline solution until substantially neutral, and the organic layer distilled under a pressure of about 5 mm. of mercury. Butyl benzyl phosphates started distilling at about 160° C. but the mass decomposed with vigorous foaming and evolution of fumes before distillation could be completed. Another sample of the crude mixed butyl benzyl phosphates was washed with an aqueous alkaline solution to remove the bulk of acid impurities and the organic layer was distilled in the presence of a small excess of solid soda ash. A clear neutral liquid, distilling at 160° to 200° C. under 5 mm. of mercury, was obtained with substantially no decomposition.

The foregoing disclosure and description is illustrative and many modifications and variations will occur to those skilled in the art and yet be within the scope of the invention which is defined by the appended claims.

I claim:

1. A process for producing higher molecular weight purified alkyl phosphates from crude reaction masses obtained in the production of said alkyl phosphates and containing acidic impurities which comprises adding an alkali in excess of the amount necessary to neutralize said acid impurities and heating the resulting continuously alkaline mass at sub-atmospheric pressure and at a temperature of 200° C. to 290° C., whereby said alkyl phosphate is distilled over under substantially anhydrous conditions in a substantially pure form.

2. A process for producing a substantially pure compound selected from the group consisting of alkyl phosphates and substituted alkyl phosphates from crude reaction masses obtained by reacting an aliphatic alcohol with phosphorus oxychloride which comprises heating said reaction mass containing an alkali in excess of the amount necessary to render said reaction mass continuously neutrally reacting to temperatures of at least 160° C. which vaporize said compound under substantially anhydrous conditions, and collecting the purified phosphates as a distillate.

3. A process for producing a substantially pure compound selected from the group consisting of alkyl phosphates and substituted alkyl phosphates from crude reaction masses obtained by reacting an aliphatic alcohol with phosphorus pentachloride and water which comprises heating said reaction mass containing an alkali in excess of the amount necessary to render said reaction mass continuously neutrally reacting to temperatures of at least 160° C. which vaporize said compound under substantially anhydrous conditions, and collecting the purified phosphates as a distillate.

4. A process for producing purified alkyl and substituted alkyl phosphates from impure reaction masses formed in the production of said phosphates which comprises heating said reaction mass containing an alkali in excess of the amount necessary to render said reaction mass continuously neutrally reacting to temperatures of at least 160° C. which vaporize said phosphates under substantially anhydrous conditions, and collecting the purified phosphates as a distillate.

5. A process for producing purified alkyl and substituted alkyl phosphates from impure reaction masses formed in the production of said phosphates which comprises heating said reaction mass containing a solid alkali in excess of the amount necessary to render said reaction mass continuously neutrally reacting to temperatures of at least 160° C. which vaporize said phosphates under substantially anhydrous conditions, and collecting the purified phosphates as a distillate.

6. A process for producing purified halogenalkyl phosphates from crude reaction masses formed in the production of said phosphates which comprises heating said reaction mass containing a solid alkali in excess of the amount necessary to render said reaction mass continuously neutrally reacting to temperatures of at least 160° C. which vaporize said phosphates under substantially anhydrous conditions, and collecting the purified phosphates as a distillate.

7. A process for producing purified mixed benzyl alkyl phosphates from crude reaction masses formed in the production of said phosphates which comprises heating said reaction mass containing a solid alkali in excess of the amount necessary to render said reaction mass continuously neutrally reacting to temperatures of at least 160° C. which vaporize said phosphates under substantially anhydrous conditions, and collecting the purified phosphates as a distillate.

8. A process for producing purified alkyl and substituted alkyl phosphates from crude reaction masses formed in the production of said phosphates which comprises heating said reaction mass containing sodium carbonate in excess of the amount necessary to render said reaction mass continuously neutrally reacting to temperatures of at least 160° C. which vaporize said phosphates under substantially anhydrous conditions, and collecting the purified phosphates as a distillate.

9. A process for producing purified alkyl and substituted alkyl phosphates from crude reaction masses formed in the production of said phosphates which comprises heating said reaction mass containing sodium hydroxide in excess of the amount necessary to render said reaction mass continuously neutrally reacting to temperatures of at least 160° C. which vaporize said phosphates under substantially anhydrous conditions, and collecting the purified phosphates as a distillate.

10. A process for producing purified alkyl and substituted alkyl phosphates from crude reaction masses formed in the production of said phosphates which comprises heating said reaction mass containing an admixture of solid sodium hydroxide and sodium carbonate in excess of the amount necessary to render said reaction mass continuously neutrally reacting to temperatures of at least 160° C. which vaporize said phosphates under substantially anhydrous conditions, and collecting the purified phosphates as a distillate.

11. A process for producing purified alkyl phosphates from acid-containing crude reaction masses obtained in the production of said phosphates which comprises removing a substantial portion of the acid constituents from the reaction mass, introducing an alkali in excess of the amount necessary to render any remaining acid constituents neutral, and heating the resulting continuously alkaline reaction mass to temperatures of at least 160° C. to distill over the alkyl phosphates under substantially anhydrous conditions in a substantially pure form.

EDWIN P. PLUEDDEMANN.

REFERENCES CITED

The following references are of record in the file of this patent:

UNITED STATES PATENTS

| Number | Name | Date |
|---|---|---|
| 2,008,478 | Vanderbilt | July 16, 1935 |
| 2,066,461 | Engs | Jan. 5, 1937 |
| 2,358,133 | Stoesser et al. | Sept. 12, 1944 |